F. SCHUBERT.
POCKET PRESSURE GAGE.
APPLICATION FILED NOV. 17, 1910.

994,878.

Patented June 13, 1911.

WITNESSES:
Edgar M Greenbaum
Charles V. Dwyer

INVENTOR
Frederick Schubert,

ATTORNEY

UNITED STATES PATENT OFFICE.

FREDERICK SCHUBERT, OF SELLERSVILLE, PENNSYLVANIA.

POCKET PRESSURE-GAGE.

994,878.

Specification of Letters Patent. Patented June 13, 1911.

Application filed November 17, 1910. Serial No. 592,798.

*To all whom it may concern:*

Be it known that I, FREDERICK SCHUBERT, a citizen of the United States, and resident of Sellersville, in the county of Bucks and State of Pennsylvania, have invented certain new and useful Improvements in Pocket Pressure-Gages, of which the following is a specification.

This invention relates to pocket pressure test gages for pneumatic tires and other purposes and has for its object to produce a small convenient device for quickly ascertaining the maximum pressure of a pneumatic tire and the like, without loss of air and without the possibility of getting a false reading.

In my pending application, Serial Number 584,459, for a similar device, I show internal means for resetting the hand to zero after a reading has been made, and in the present invention the movement and indicator is set back to zero by a plunger or push button which extends through the side of the case as will be more fully hereinafter described.

The accompanying drawings illustrate the preferred embodiment of the invention but it is understood that changes, variations and modifications can be resorted to which come within the scope of the claims hereunto appended.

Figure 1:
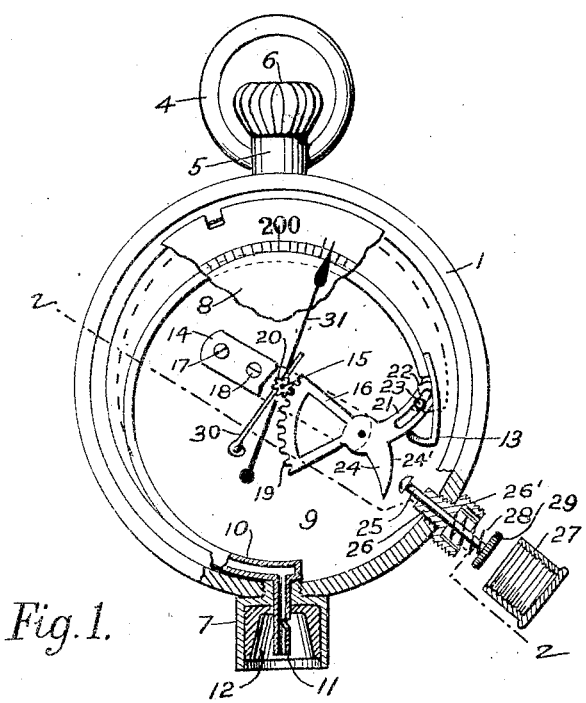
Figure 2:
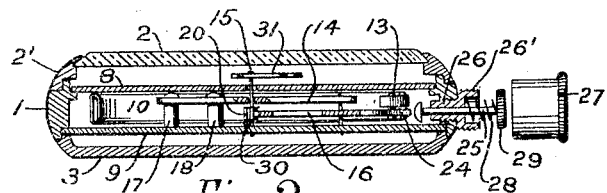
Figure 3:
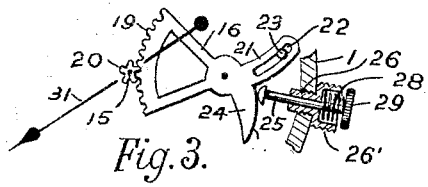

In the drawings, wherein like reference characters denote corresponding parts in the several views, Figure 1, is a front elevation, the glass and rim being removed, the dial broken away in part and the frame for the movement being shown in part by dotted lines for clearness of illustration: the socket is shown in center section. Fig. 2 is a cross sectional view on dot and dash line 2—2 of Fig. 1, and Fig. 3 is an elevation of the sector, pinion, indicator and plunger in the position assumed when movement and indicator is returned to zero.

For convenience in carrying, the gage is inclosed in a case, 1, similar in size and appearance to the electrical pocket meters used to quickly determine the strength of an electric current, the complete case comprising the glass cover, 2, glass rim, 2′, back cover, 3, ring, 4, ring stud, 5, and knob, 6: the ring 4, is pivoted in the stud as usual, and the knob and stud may be of one piece, for the reason that it is only used to press the case down upon a tire nipple, as the socket, 7, is diametrically opposite the knob.

The dial, 8, is held in place in any preferred manner; the movement proper may be completely mounted on a base plate, 9.

A Bourdon-tube spring, 10, is fastened to the lower part of the case, where it communicates with a hollow pin, 11, being centrally situated within the socket, 7, which socket is provided with a soft rubber lining, 12, slightly tapered, to adapt it to slip over any standard tire nipple—not shown. The free end of the Bourdon-tube spring is capped, a hook, 13, being preferably soldered at or near the end as shown.

The movement consists of a bearing frame, 14, in which the pinion shaft, 15, and the sector, 16, are journaled; this frame is preferably mounted on two posts, 17, 18, which are fastened to the base plate. The sector has teeth, 19, on the periphery of the arc, as usual, which engage the pinion, 20. The free end of the sector is preferably divided into two curved wings, the one wing, 21, having a slot, 22, in which a stud, 23, is adjustably mounted; the other wing, 24, has a reverse curve, the arc, 24′, being so shaped that when the plunger, 25, is pushed inward,—as shown in Fig. 3—it will slide along the periphery of the curve or arc, for the purpose explained in the operation. The plunger is centrally mounted in a socket, 26, which is fastened at a proper point in the case, having a male thread, 26′, upon which a cap, 27, is screwed for protection: a coiled spring, 28, keeps the plunger distended by pressing outwardly against the button, 29.

A friction spring, 30, soldered on the base plate, is used to press against the pinion shaft, 15, for holding the indicator or pointer, 31, at the maximum point, said indicator being mounted on the pinion shaft above the dial, which is marked as usual.

In Fig. 1, the Bourdon-tube spring is shown in a normal position, the dotted circle showing its position when distended; the movement, however, is shown as having been actuated by the hook, 13,—which has returned to its normal position as stated,—the wing, 24, being in the path of the plunger, 25.

Such being the construction, the operation is as follows: To ascertain the pressure within a pneumatic tire, the gage is pressed down tightly over the nipple, the pin opening the valve and letting the air enter up through the pin into the Bourdon-tube spring, which distends according to the pressure. The gage is removed and the pressure indicated by the pointer and the dial, is noted. In testing, the hook pulls the sector only in one direction under pressure; as soon as the pressure is released the Bourdon-tube spring and hook return to their normal position, (shown in Fig. 1) leaving the indicator and movement, however, in exactly the same position as when under pressure, the friction of the spring, 30, against the pinion shaft tending to hold the pointer or indicator at the maximum point. To reset the pointer and movement to zero, the plunger is pushed inward, the head or end striking the arc, 24' of the wing, 24, of the sector (as shown in Fig. 3) whereby the pinion is rotated and the pointer brought to zero. The plunger is drawn back out of the path of the wing, 24, by the coiled spring, 28.

What I claim is:

1. In a pressure gage, a case provided with a socket at its lower end, said socket being lined with a flexible material, a hollow pin in said socket, a Bourdon-tube spring fastened to said case, said Bourdon-tube spring having communication with said pin and socket, a hook on the free end of said Bourdon-tube spring, a sector provided at its free end with two oppositely curved wings, a stud on one of said wings to be engaged by the hook on said spring, a pinion mounted upon a pinion shaft and engaging said sector, an indicator surmounting said pinion shaft, a dial upon which the indicator shows the pressure, and means extending through the side of said case for engagement with the other of said sector wings for resetting the pointer to zero.

2. In a pocket pressure gage for pneumatic tires, a case provided with a socket on its periphery, said socket being adapted to make an air-tight joint with a tire nipple, a Bourdon-tube spring fastened to said case, a hollow pin centrally placed in said socket and having communication with said spring, a sector within the case having two diverging curved wings at its free end, one of said wings having means for engaging the free end of said Bourdon-tube spring, means extending through the side of the case and engaging the other wing of said sector for setting the pointer to zero, a pinion and a shaft mounted in a frame within said case, said pinion engaging said sector, a pointer mounted on said pinion shaft, and a dial upon which the pointer indicates the pressure.

3. In a pocket pressure gage for pneumatic tires, a case provided with means for connecting with a pneumatic tire, a movement in said case comprising a Bourdon-tube spring having a communication with said connecting means, a sector, a wing carried by the sector, a pinion mounted on a pinion shaft and engaging said sector, a pointer on said pinion shaft, a dial upon which the pointer indicates the pressure, means on the free end of said Bourdon-tube spring for engagement with the sector to operate the latter in one direction only, and means extending through the side of the case for engagement with the wing carried by the sector to move the latter in the opposite direction for resetting the pointer to zero.

Signed at Sellersville, in the county of Bucks and State of Pennsylvania, this 15th day of November, A. D. 1910.

FREDERICK SCHUBERT.

Witnesses:
RICHARD WERCHAN,
WILLIAM A. HEINRICHS.